US008854382B2

(12) United States Patent
Hong et al.

(10) Patent No.: US 8,854,382 B2
(45) Date of Patent: Oct. 7, 2014

(54) MULTI-FUNCTION ENCODER AND DECODER DEVICES, AND METHODS THEREOF

(75) Inventors: Edward Hong, Toronto (CA); Hongri Wang, Richmond Hill (CA); Dong Liu, Markham (CA); Kai Yang, Richmond Hill (CA); Indra Laksono, Richmond Hill (CA); Eric Young, Markham (CA); Xu Gang Zhao, Maple (CA)

(73) Assignee: VIXS Systems, Inc., Toronto, Ontario (CA)

( * ) Notice: Subject to any disclaimer, the term of this patent is extended or adjusted under 35 U.S.C. 154(b) by 336 days.

(21) Appl. No.: 12/965,109

(22) Filed: Dec. 10, 2010

(65) Prior Publication Data

US 2012/0147017 A1 Jun. 14, 2012

(51) Int. Cl.
*G06T 1/20* (2006.01)
*H04N 19/423* (2014.01)
*H04N 19/42* (2014.01)

(52) U.S. Cl.
CPC ... *H04N 19/00527* (2013.01); *H04N 19/00484* (2013.01)
USPC .......................................... 345/506; 345/558

(58) Field of Classification Search
CPC .............................................. H04N 19/00478
See application file for complete search history.

(56) References Cited

U.S. PATENT DOCUMENTS 8,149,920 B2 * 4/2012 Jang et al. ................. 375/240.24
2008/0291062 A1 11/2008 Watanabe et al.

FOREIGN PATENT DOCUMENTS

WO 2007040297 A1 4/2007

OTHER PUBLICATIONS

Lee, Edward, et al., "Dataflow Process Networks", Proceedings of the IEEE, vol. 83, No. 5, May 1995, pp. 773-799.*
Jer-Min Hsiao et al. "Analysis of an SOC Architecture for MPEG Reconfigurable Video Coding Framework", Circuits and Systems, 2007. ISCAS 2007. IEEE International Symposium O N, IEEE, PI, May 1, 2007, pp. 761-764.
Euee S. Jang et al. "Study of Video Coding Tools Repository V.5.0". MPEG Meeting; Jul. 25, 2005-Jul. 29, 2005; Poznan; (Motion Pictureexpert Group or ISO/IEC JTC1/SC29/WG11), No. N7329, Jul. 29, 2005, 15 pages.
European Search Report for European Application No. 11192163.1-2223, dated Mar. 12, 2012, 9 pages.

* cited by examiner

*Primary Examiner* — Hau Nguyen
*Assistant Examiner* — Ryan M Gray (57) ABSTRACT

A technique for encoding and decoding video information uses a plurality of video processing modules (VPMs), whereby each video processing module is dedicated to a particular video processing function, such as filtering, matrix arithmetic operations, and the like. Information is transferred between the video processing modules using a set of first-in first-out (FIFO) buffers. For example, to transfer pixel information from a first VPM to a second VPM, the first VPM stores the pixel information at the head of a FIFO buffer, while the second VPM retrieves information from the tail of the FIFO buffer. The FIFO buffer thus permits transfer of information between the VPMs without storage of the information to a cache or other techniques that can reduce video processing speed.

20 Claims, 5 Drawing Sheets

FIG. 5 ated with the video bitstream and video information that has been decoded by video decoder 102. To illustrate, frame buffer 103 can receive compressed video information embedded in the video bitstream, store the compressed video information, provide the compressed video information to other modules of the video decoder 102 for decompression, store one or more frames of decompressed video information, and provided the decompressed frames to another module or device for rendering and display.

MULTI-FUNCTION ENCODER AND DECODER DEVICES, AND METHODS THEREOF

FIELD OF THE DISCLOSURE

The present disclosure relates generally to data processing and more particularly to of the processing of video information.

BACKGROUND

Storage and communication of digital video information is useful in a variety of video devices, such as video recorders, set-top boxes, DVD players, and the like. Because uncompressed video information can demand a large amount of bandwidth, video information is typically compressed at an encoder device prior to storage or communication, and decompressed at a decoder device for rendering and display. The specific format employed to compress and decompress the video information is referred to as a codec. In order to enhance the flexibility of a video device, it is frequently desirable a video processing device be able to encode or decode video information based on a variety of codecs. Accordingly, the video processing device can include a number of dedicated hardware modules, whereby each dedicated hardware module is designed to encode or decode received video information according to a corresponding codec. However, such dedicated hardware modules can consume an undesirable amount of circuit area and other resources.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

FIGS. 1-5 illustrate exemplary techniques for encoding and decoding video information using a plurality of video processing modules (VPMs), whereby each video processing module is dedicated to a particular video processing function, such as filtering, matrix arithmetic operations, and the like. Information is transferred between the video processing modules using a set of first-in first-out (FIFO) buffers. For example, to transfer pixel information from a first VPM to a second VPM, the first VPM stores the pixel information at the head of a FIFO buffer, while the second VPM retrieves information from the tail of the FIFO buffer. The FIFO buffer thus permits transfer of information between the VPMs without storage of the information to a cache or other techniques that can reduce video processing speed.

Further, the FIFO used to transfer the information between VPMs can be selected from a set of FIFOs based on the video codec employed to encode and decode the video information. To illustrate, the VPMs can be flexibly configured to implement different codecs, such that video information is processed at the VPMs in a particular order that is based upon the codec associated with the video information. For example, for one video codec, a VPM (designated VPM A) may process the video information, with the results provided to another VPM (designated VPM B). For a different video codec, VPM A may process the video information with the results passed to a different VPM (designated VPM C). Accordingly, for the first codec, VPM A can transfer the results of the video processing to VPM B by storing the results at one FIFO, and for the second codec, VPM A can transfer the video processing results to VPM C by storing the results at a different FIFO. Thus, the use of the FIFOs to transfer information allows for each VPM to implement a particular encoding or decoding function, with the relationship between the functions determined, at least in part, according to the particular FIFOs used to transfer information between the VPMs.

Figure 1:
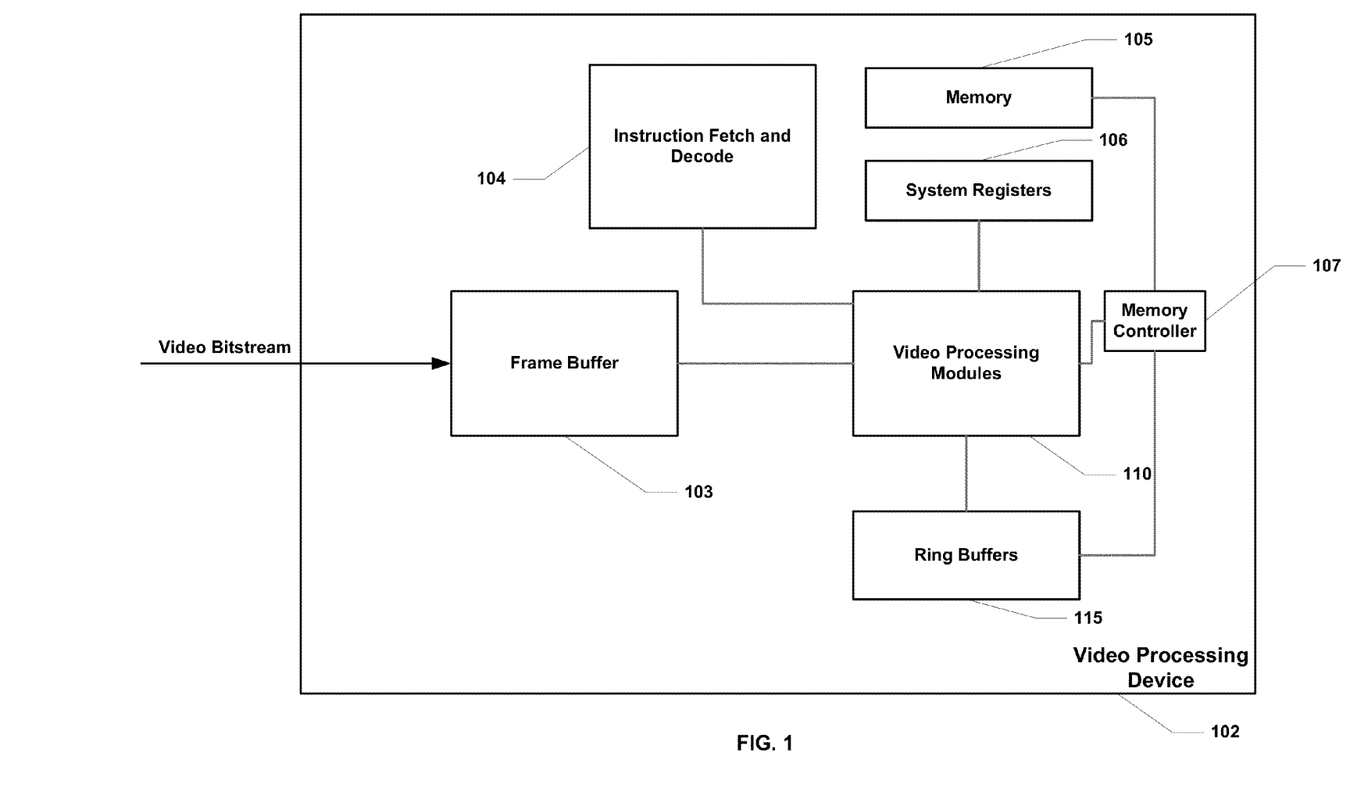
FIG. 1 is a block diagram illustrating a video processing device in accordance with one embodiment of the present disclosure.

FIG. 1 illustrates a block diagram of a video processing device 102 in accordance with one embodiment of the present disclosure. For purposes of discussion, it is assumed that the video processing device 102 is a video decoder device. However, in other embodiments, video processing device 102 can be a video encoder, or can perform both video encoding and video decoding.

Video decoder 102 is a processor device generally configured to receive and decode a compressed video bitstream based on a codec associated with the video bitstream. To illustrate, video decoder 102 can be incorporated in a video playback device, such as a DVD player, that retrieves compressed video information from a storage medium and provides the compressed video information to the video decoder 102 via the video bitstream. The video decoder 102 determines the codec according to which the video information was compressed and decodes the video information, based on the determined codec, to generate a decompressed video stream. The decompressed video stream can be stored, provided to a rendering device for display, and the like, or any combination thereof. As used herein, the term "codec" refers to the algorithm employed to encode (e.g. compress) or decode (e.g. decompress) video information.

To facilitate encoding or decoding of the video bitstream, the video decoder 102 includes a frame buffer 103, an instruction fetch and decode module 104, a memory 105, system registers 106, a memory controller 107, video processing modules 110, and ring buffers 115. Frame buffer 103 is a memory structure, such as first-in first-out (FIFO) buffer, that receives and stores video information communicated via a video bitstream. In particular, frame buffer 103 stores pixel information, motion vector information, and other information representing a set of video images for display. In an embodiment, frame buffer 103 can store both the compressed video information received via the video bitstream and video information that has been decoded by video decoder 102. To illustrate, frame buffer 103 can receive compressed video information embedded in the video bitstream, store the compressed video information, provide the compressed video information to other modules of the video decoder 102 for decompression, store one or more frames of decompressed video information, and provided the decompressed frames to another module or device for rendering and display.

Instruction fetch and decode module 104 fetches and decodes sets of instructions to decode video information received via the video bitstream. In particular, instruction fetch and decode module 104 is a set of stages associated with an instruction pipeline (not shown), whereby each stage of the instruction pipeline processes information according to the function of the corresponding stage. To illustrate, fetch and decode module 104 fetches instructions from an instruction buffer (not shown) and decodes the fetched instructions into one or more instruction operations for provision to execution modules for execution. The instructions stored at the instruction buffer provide for determination of the codec associated with the video information received via the video bitstream and decompression of the video information based on the determined codec.

The VPMs 110 include one or more execution modules, whereby each execution module receives instruction operations and executes its dedicated task according to the parameters indicated by the operations. For example, the instruction operations for a VPM dedicated to matrix arithmetic operations can indicate the particular arithmetic operation to be executed, the operands for the arithmetic operation, and the like. In an embodiment, each of the VPMs 110 is configured to execute a designated type of operation, such as retrieval of information from memory, filtering, matrix arithmetic, and the like. Using a sequence of instruction operations, video decoder 102 processes received video information at the video processing modules 110 to decode the video information according to the associated codec. In particular, the sequence of instruction operations controls the video processing modules to determine the codec associated with the received video information, decompress the video information based on the determined codec, and store the decompressed video information.

In another embodiment, the sequence of instruction operations can control the VPMs 110 to encode video information according to one of plurality of available codecs. For example, the sequence of instruction operations can control the video processing modules to determine a codec selection, compress the video information based on the determined codec, and store the compressed video information.

The memory 105 is volatile or non-volatile memory, or any combination thereof, employed by the video decoder 102 to store information used during operation of the decoder. Accordingly, the memory 105 can, based on control signaling, store and provide information at locations designated by a memory address. Memory controller 107 is a control device that receives instruction operations requesting information to be stored at or retrieved from the memory 105. In response, the memory controller 107 provides control signaling to the memory 105 to execute the indicated operation. The system registers 106 are a set of registers that are accessible to store information and provide stored information in response to control signaling.

The ring buffers 115 are a set of FIFO buffers whereby, in response to one or more instruction operations, each ring buffer is to store and retrieve information based on the location of corresponding head and tail pointers. To illustrate, each of the ring buffers is associated with a corresponding head pointer, indicating the next location to store information, and a corresponding tail pointer, indicating the next location from which to retrieve information. In response to a store operation, the ring buffer stores information at the location indicated by the head pointer. Similarly, in response to a load operation, the ring buffer retrieves information at the location indicated by the tail pointer. Further, in response to load and store operations, the tail pointer and load pointer, respectively, are adjusted to the next sequential location in the buffer to facilitate operation as a FIFO memory. When each pointer reaches a designated end location in sequential memory for the buffer, the pointer is returned to a designated initial location in sequential memory, thereby establishing a ring structure for the buffer.

Figure 2:
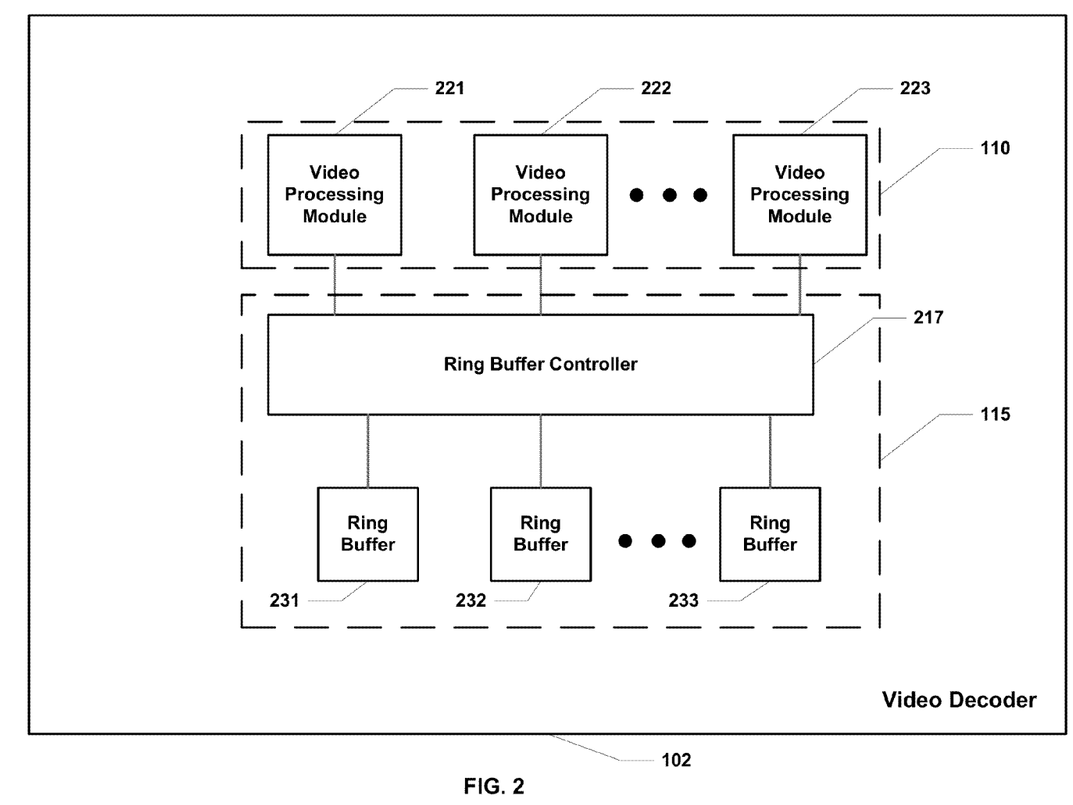
FIG. 2 is a block diagram illustrating aspects of modules of the video processing device of FIG. 1 in accordance with one embodiment of the present disclosure.

During operation of the video decoder 102, the video processing modules 110 employ the ring buffers 115 to transfer information between the processing modules. This can be better understood with reference to FIG. 2, which illustrates a particular embodiment of the video processing modules 110 and the ring buffers 115. In the illustrated embodiment, the video processing modules includes N processing modules, where N is an integer. FIG. 2 illustrates 3 of the N video processing modules, including video processing modules 221, 222, and 223. The ring buffers 115 include a ring buffer controller 217 and M individual ring buffers, where M is an integer. In an embodiment, M is equal to N−1. FIG. 2 illustrates 3 of the M ring buffers, including ring buffer 231, 232, and ring buffer 233. In an embodiment, the ring buffers are physically located such that four ring buffers are together in a cluster to share a ring buffer controller, and share the physical RAM device that stores the information at the buffers.

Ring buffer controller 217 is a module configured to provide an interface between the video processing modules 110 and the ring buffers. Accordingly, ring buffer controller 217 receives control signaling from the video processing modules 110 indicating an instruction operation associated with a ring buffer. The control signaling indicates whether the instruction operation is a load or store, the data to be stored in the event of a store operation, and the ring buffer associated with the operation, and receives data from a ring buffer in the event of a load operation. In response to the control signaling, the ring buffer controller 217 executes the indicated load or store operation at the indicated ring buffer. For example, in the case of a store operation, the ring buffer controller 217 stores data at the indicated buffer. In the case of a load operation, the ring buffer controller 217 retrieves stored information from the buffer and provides the retrieved information to the video processing module that requested the load operation. The ring buffer controller 217 also manages the head and tail pointers for each of the ring buffers to implement a FIFO structure for each buffer.

In operation, the video processing modules 110 employ the ring buffers 115 to transfer information between the modules. In particular, in response to completing a designated processing operation on a segment of information, such as a pixel, a video processing module stores the processed information at one of the ring buffers 115. Another video processing module can retrieve the processed information from the ring buffer for further processing.

Figure 3:
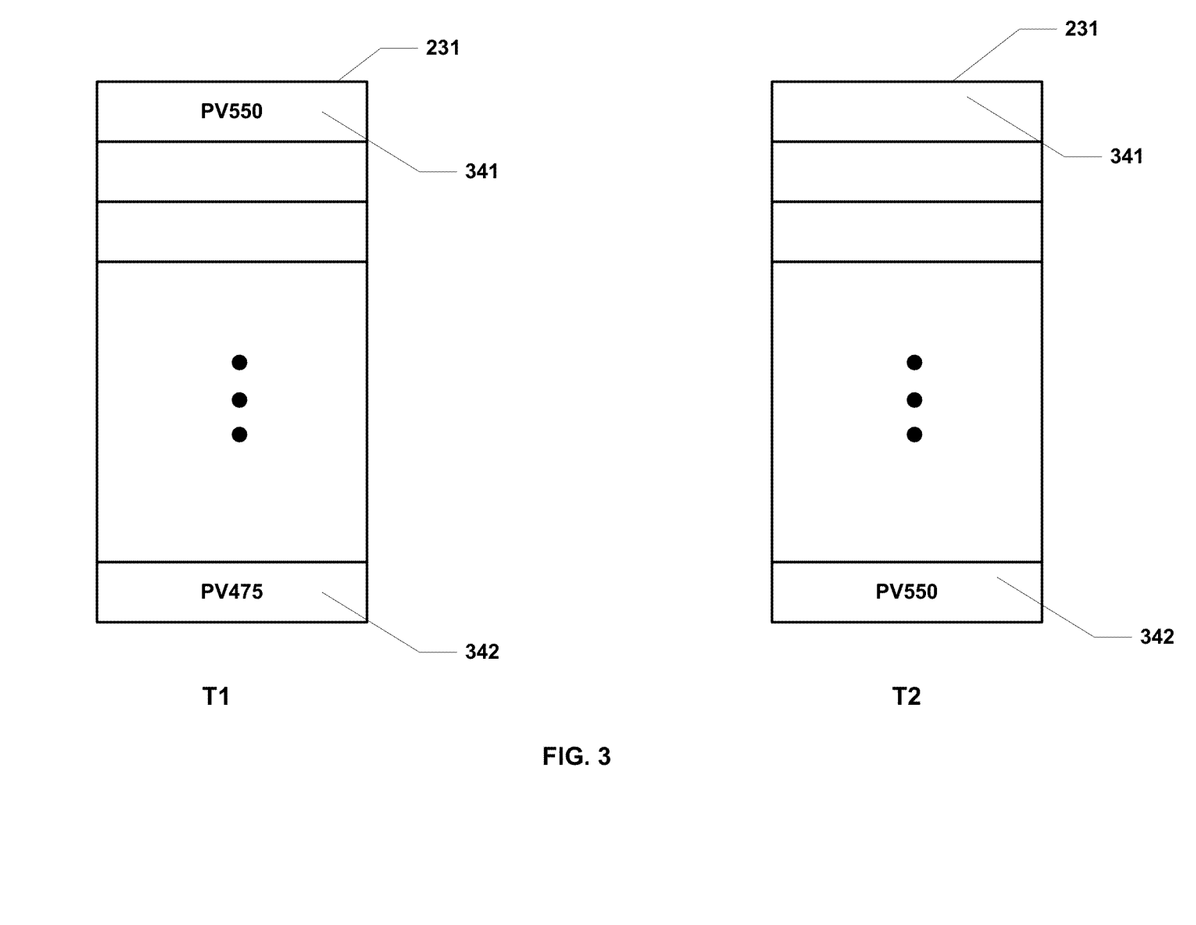
FIG. 3 is a diagram illustrating operation of the ring buffers of FIG. 2 in accordance with one embodiment of the present disclosure.

This can be better understood with reference to an example, illustrated at FIG. 3 where VPM 221 executes a filtering operation, VPM 222 executes a matrix arithmetic operation, and ring buffer 231 is employed to transfer information from VPM 221 to VPM 222. It is assumed for purposes of the example that a pixel is filtered by VPM 221 and the filtered pixel is then transferred to VPM 222 for matrix arithmetic. FIG. 3 illustrates the contents of ring buffer 231 at two different times, designated T1 and T2, where time T1 is prior to time T2. The example of FIG. 3 further illustrates the head location and tail location for ring buffer 231, identified as head location 341 and tail location 342, respectively. It will be appreciated that the physical location and address of each of the head location 341 and the tail location 342 will change as the associated pointers are changed in response to data being stored and retrieved from the ring buffer 231. It will be appreciated that, because ring buffer 231 is a FIFO structure, the relative positions of the head location 241 and the tail location 242 can change, and will depend on the amount of information stored at the buffer. For example, if only one pixel is stored at ring buffer 231, the head location 241 and tail location 242 will be the same location.

To illustrate a transfer of information between VPM 221 and VPM 222, at time T1 VPM 221 stores a filtered pixel value, labeled PV550, at head location 231. In addition, at time T1, a different filtered pixel value, labeled PV475, is available at tail location 342 for retrieval by VPM 222 via a load operation. At time T2, the tail location corresponds to the location where PV550 is stored. Accordingly, at time T2 a load operation provided by VPM 222 results in PV550 being provided to VPM 222.

As indicated by the illustrated example of FIG. 3, the FIFO structure of ring buffer 231 allows for pixels to be passed between the VPMs 221 and 222 without regard to the timing of load and store operations at the other VPM. For example, VPM 222 can load a pixel value from the ring buffer 231 without polling the buffer or otherwise determining whether a pixel value is available to be loaded. This provides for faster transfer of information between VPMs over conventional devices that employ a cache or system memory to transfer information. The overhead associated with management of the cache can impact video processing speed. In particular, storage of the information to a cache or addressable memory, such as system memory, can require the calculation of the address for the memory location where the video information is to be stored or retrieved. In contrast, the ring buffers 115 do not include memory locations that are individually addressable. That is, the buffer locations of the ring buffers 105 cannot be accessed individually according to addresses associated with each location. Instead, the only location for each of the ring buffers 115 that can be accessed is the location pointed to by the corresponding head and tail pointers. Accordingly, access to the ring buffers 115 does not require calculation of an address, thereby reducing access time as compared to a cache or system memory. Thus, because they reduce the need for storing information to a cache or system memory, the ring buffers 115 can improve the rate at which the video bitstream is processed. Further, in some conventional systems, the VPMs must pass messages between each other to indicate when data is available for processing. This can undesirably increase the complexity of the instruction operations provided to each VPM. The ring buffers 115 thus allow for simplification of the software that provides the instruction operations to each VPM.

Further, the ring buffers 115 provide flexibility for changes to the order in which the VPMs 110 process information. In particular, decoding for different codecs can require processing operations to occur in a different order. For example, one codec can require that video information be filtered first and then undergo a matrix arithmetic operation. A different codec can require a matrix arithmetic operation before a filtering operation. Accordingly, the ring buffers 115 allow for information to be transferred between the VPMs 110 to implement the processing order required by the codec associated with the video information. This can be better understood with reference to FIG. 4, which illustrates the flow of video information through the VPMs 110 at two different time spans, designated T1 and T2. At time span T1, it is assumed that the VPMs 110 are decoding video information associated with one codec, and at time span T2 the VPMs 110 are decoding video information associated with a different codec. Accordingly, at time span T1, VPM 221 transfers processed information to VPM 222 by storing the processed information at ring buffer 231.

Figure 4:
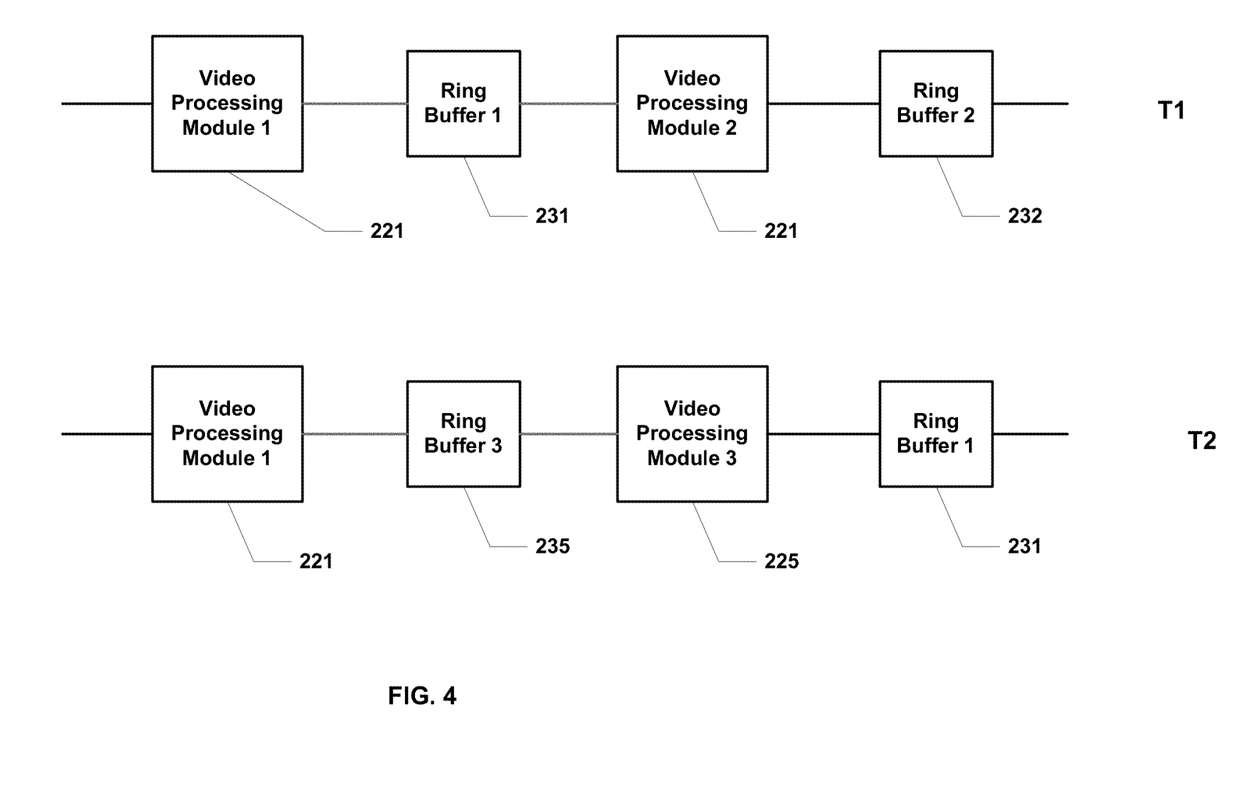
FIG. 4 is a diagram illustrating operation of the video processing modules and ring buffers of FIG. 2 in accordance with one embodiment of the present disclosure.

VPM 222 retrieves the processed information from ring buffer 231, further processes the information, and stores the results at ring buffer 232 for transfer to another VPM. At time span T2, VPM 221 transfers information to VPM 225 by storing processed information at ring buffer 235. VPM 222 retrieves the processed information from ring buffer 235, further processes the information, and stores the results at ring buffer 231 for transfer to another VPM. Thus, as illustrated by FIG. 4, the particular buffer used by a VPM to transfer information depends on the codec associated with the video information being decoded.

The order in which video information is processed at the VPMs 110 and stored at the ring buffers 115 can be enforced by placing the appropriate load and store instructions in the instruction operations for decoding or encoding the video information. To illustrate, the instruction operations associated with decoding a particular codec can include instruction operations to load video information from a designated ring buffer, where the ring buffer is indicated by an argument of the load operation. For example, the instruction operation LOAD REGA, BUF1 can instruct a VPM to load the information at the tail location of ring buffer BUF1 to register A. Subsequent instruction operations can instruct the VPM to process the contents of register A. Other instruction operations can store processed information at a ring buffer designated by arguments of the instruction. Thus, by employing load and store instruction operations for each VPM, whereby the arguments for each load and store instruction designate the particular buffer from which the information is loaded or stored, the video decoder 102 can determine the order in which video information is processed at the decoder. Accordingly, because the order in which the video information is processed is based upon the codec associated with the video information, the arguments for the load and store instructions provided to each of the VPMs 110 will depend on the codec associated with the video information.

Figure 5:
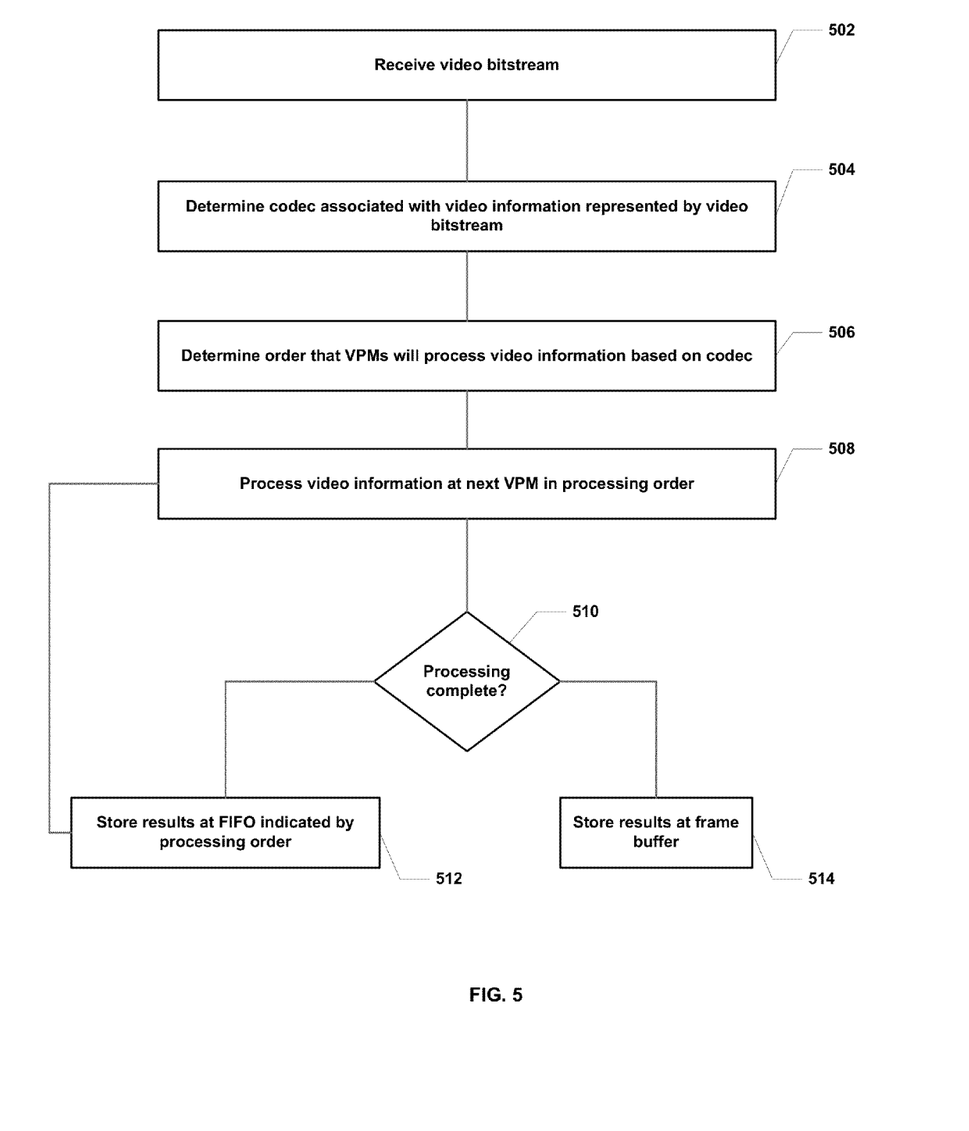
FIG. 5 is a flow diagram illustrating a method of processing a video bitstream in accordance with one embodiment of the present disclosure.

Referring to FIG. 5, a flow diagram of a method of processing a video bitstream at the video decoder 102 is illustrated. At block 502, the video decoder 102 receives the video bitstream. At block 504, the video decoder 102 determines the codec associated with video information represented by the video bitstream. In particular, the video decoder 102 determines the technique, as indicated by the codec, that was employed to compress the video information. At block 506, the video decoder 102 determines, based on the codec, the order that the VPMs 110 will process the video information. At block 508, the video information is provided to the next VPM in the determined order for processing. At block 510, the video decoder 102 determines whether processing of the video information is complete. For example, the video decoder can determine whether the video information has been decompressed according to the codec. If the processing of the video information is complete, the flow proceeds to block 514 and the processed video information is stored at the frame buffer 103. If processing of the video information is not complete, the flow moves to block 512, and the processed video information is stored at one of the ring buffers 115 as indicated by the determined processing order. The method flow returns to block 508, where the next VPM in the determined order retrieves the video information from the ring buffer for further processing.

Other embodiments, uses, and advantages of the disclosure will be apparent to those skilled in the art from consideration of the specification and practice of the disclosure disclosed herein. The specification and drawings should be considered exemplary only, and the scope of the disclosure is accordingly intended to be limited only by the following claims and equivalents thereof.

What is claimed is:

1. In a multimedia processing device, a method comprising:
at a first time, processing first video information at a first video processing module of an instruction pipeline to determine first processed video information;
storing the first processed video information at a first first-in first-out (FIFO) buffer, selected from a plurality of FIFOs, in response to identifying that the first video information is associated with a first codec;
retrieving the first processed video information from the first FIFO buffer for processing at a second video processing module of the instruction pipeline in response to identifying that the first video information is encoded according to the first codec;
at a second time, processing second video information at the first video processing module to determine second processed video information; and
storing the second processed video information at a second FIFO buffer selected from the plurality of FIFOs, in response to identifying that the second video information is associated with a second codec, the first codec different from the second codec and the second FIFO buffer different from the first FIFO buffer.

2. The method of claim 1, further comprising:
processing the first processed video information at the second video processing module to determine third processed video information;
storing the third processed video information at a third FIFO buffer; and
retrieving the third processed video information from the third FIFO buffer for processing at a third video processing module.

3. The method of claim 2, further comprising selecting the third FIFO buffer based on the first codec.

4. The method of claim 1, wherein storing the first processed video information at the first FIFO buffer comprises storing the first processed video information at the first FIFO buffer based on a store instruction having an operand that identifies the first FIFO buffer.

5. The method of claim 4,
wherein retrieving the first processed video information from the first FIFO buffer comprises retrieving the first processed video information from the first FIFO buffer based on a load instruction having an operand that identifies the first FIFO buffer.

6. The method of claim 1, further comprising:
retrieving the second processed video information from the second FIFO for processing at a third video processing module different from the first video processing module to determine third processed video information.

7. The method of claim 6, further comprising:
storing the third processed video information at the first FIFO buffer in response to in response to identifying that the second video information is encoded according to a second codec.

8. The method of claim 6, further comprising:
storing the third processed video information at a third FIFO buffer in response to in response to identifying that the second video information is associated with the second codec.

9. The method of claim 1, wherein the first video processing module and the second video processing module are configured to perform operations associated with decompressing the video information.

10. The method of claim 1, wherein the first video processing module and the second video processing module are configured to perform operations associated with compressing the video information.

11. A method, comprising:
in response to, at a first time, receiving a first video bitstream representing first video information associated with a first codec
selecting a first FIFO buffer of a plurality of FIFO buffers based on the first codec;
storing, at the first FIFO buffer, second video information processed at a first video processing module of an instruction pipeline in response to receiving the first video information;
in response to, at a second time, receiving a second video bitstream representing second video information associated with a second codec, selecting a second FIFO buffer of the plurality of FIFO buffers based on the second codec, the second FIFO buffer different from the first FIFO buffer and the second codec different from the first codec; and
storing, at the second FIFO buffer, third video information processed at the first video processing module in response to receiving the second video information.

12. The method of claim 11, further comprising:
processing the third video information at a second video processing module to determine fourth video information; and
storing the fourth video information at the first FIFO buffer in response to identifying the second video information as associated with the second codec.

13. The method of claim 11, wherein the first video processing module and the second video processing module are configured to perform operations associated with decompressing the first video information.

14. The method of claim 11, wherein the first video processing module and the second video processing module are configured to perform operations associated with compressing the first video information.

15. A device, comprising:
an input to receive a first signal representative of first video information at a first time and a second signal representative of second video information at a second time;
a plurality of video processing modules of an instruction pipeline, the plurality of video processing modules comprising a first video processing module and a second video processing module, each of the plurality of video processing modules to perform an associated video processing operation; and
a plurality of FIFO buffers associated with different codecs, wherein the device is configured to select, based on a first codec associated with the first video information, a first FIFO buffer from the plurality of FIFO buffers for coupling between the first video processing module and the second video processing module, the first FIFO buffer to store first processed video information provided by the first video processing module and provide the first processed video information to the second video processing module, and wherein the device is configured to select, based on a second codec associated with the second video information, a second FIFO buffer from the plurality of FIFO buffers for coupling between the first video processing module and a third video processing module to store second processed video information processed by the first video processing module, the second FIFO buffer different from the first FIFO buffer.

16. The device of claim 15, wherein:
the device is configured to select the first FIFO buffer for coupling between the third video processing module and a fourth video processing module based on the second codec being associated with the second video information.

17. The device of claim 16, wherein the first FIFO buffer is to store the first processed video information in response to a store instruction having an operand identifying the first FIFO buffer.

18. The device of claim 17, wherein the second FIFO buffer is to retrieve the first processed video information in response to a load instruction having an operand identifying the first FIFO buffer.

19. The device of claim 15, wherein the first video processing module and the second video processing module are configured to perform operations associated with decompressing the first video information.

20. The device of claim 15, wherein the first video processing module and the second video processing module are configured to perform operations associated with compressing the first video information.

* * * * *